(12) United States Patent
Akselrod et al.

(10) Patent No.: US 8,921,795 B2
(45) Date of Patent: Dec. 30, 2014

(54) METHOD AND APPARATUS FOR FAST DETERMINATION OF UNKNOWN RADIATION DOSE

(71) Applicants: Mark S. Akselrod, Stillwater, OK (US); Kent J. Dillin, Stillwater, OK (US)

(72) Inventors: Mark S. Akselrod, Stillwater, OK (US); Kent J. Dillin, Stillwater, OK (US)

(73) Assignee: Landauer, Inc., Glenwood, IL (US)

( * ) Notice: Subject to any disclaimer, the term of this patent is extended or adjusted under 35 U.S.C. 154(b) by 36 days.

(21) Appl. No.: 13/923,402

(22) Filed: Jun. 21, 2013

(65) Prior Publication Data
US 2013/0341514 A1    Dec. 26, 2013

Related U.S. Application Data

(60) Provisional application No. 61/663,223, filed on Jun. 22, 2012, provisional application No. 61/663,241, filed on Jun. 22, 2012.

(51) Int. Cl.
*G01T 1/10* (2006.01)

(52) U.S. Cl.
CPC ........................................ *G01T 1/10* (2013.01)
USPC ..................... 250/362; 250/363.01

(58) Field of Classification Search
CPC .......................................................... G01T 1/10
USPC ........................................... 250/362, 363.01
See application file for complete search history.

(56) References Cited

U.S. PATENT DOCUMENTS

| 5,132,543 A | 7/1992 | Valentine et al. |
| 5,731,590 A | 3/1998 | Miller |
| 5,892,234 A | 4/1999 | McKeever et al. |
| 5,962,857 A | 10/1999 | McKeever et al. |
| 6,127,685 A | 10/2000 | Yoder et al. |
| 6,198,108 B1 | 3/2001 | Schweitzer et al. |
| 6,846,434 B2 | 1/2005 | Akselrod |
| 7,098,470 B2 | 8/2006 | Akselrod et al. |
| 7,157,681 B1 | 1/2007 | Tetzlaff |
| 7,420,187 B1 | 9/2008 | Klemic et al. |
| 8,115,182 B1 | 2/2012 | Patel |
| 8,373,142 B2 | 2/2013 | Yoder et al. |
| 2009/0224176 A1 | 9/2009 | Patel |

FOREIGN PATENT DOCUMENTS

| JP | 2007205766 A | 8/2007 |
| KR | 100529181 B1 | 11/2005 |
| WO | 2011086492 A2 | 7/2011 |
| WO | 2011125053 A2 | 10/2011 |
| WO | 2012036570 A1 | 3/2012 |

OTHER PUBLICATIONS

International Search Report and Written Opinion mailed Feb. 14, 2014 in corresponding International Application No. PCT/IB2013/055120.

International Search Report and Written Opinion mailed Feb. 18, 2014 in corresponding International Application No. PCT/IB2013/055115.

Botter-Jensen, L., et al., "Optically Stimulated Luminescence Dosimetry," Elsevier, 2003.

(Continued)

*Primary Examiner* — David Porta
*Assistant Examiner* — Faye Boosalis
(74) *Attorney, Agent, or Firm* — Alchemy-Partners, PC

(57) ABSTRACT

Described is a method for determination of an unknown radiation dose to which an optically stimulated luminescence (OSL) sensor has been exposed utilizing a pulsed optically stimulated luminescence (POSL) technique and a battery operated portable instrument.

11 Claims, 10 Drawing Sheets

(56) References Cited

OTHER PUBLICATIONS

Klemic, G., et al., "External Dosimetry in the Aftermath of a Radiological Terrorist Event," Radiation Protection Dosimetry, vol. 120, No. 1-4, pp. 242-249, 2006.

Akselrod, M.S., et al., "Preparation and Properties of Al2O3:C," Radiation Protection Dosimetry, vol. 47, No. 1-4, pp. 159-164, 1993.

Akselrod, M.S., et al., "Optically Stimulated Luminescence of Al2O3," Radiation Measurements, vol. 29, No. 3-4, pp. 391-399, 1998.

METHOD AND APPARATUS FOR FAST DETERMINATION OF UNKNOWN RADIATION DOSE

CROSS-REFERENCE TO RELATED APPLICATIONS

This application claims benefit of priority to U.S. Provisional Patent Application No. 61/663,223 to Akselrod et al., entitled "NOVEL OPTICAL SYSTEM FOR PORTABLE OSL READER", filed Jun. 22, 2012, and U.S. Provisional Patent Application No. 61/663,241 to Dillin et al., filed Jun. 22, 2012, entitled "METHOD AND APPARATUS FOR FAST DETERMINATION OF UNKNOWN RADIATION DOSE", the entire contents and disclosures of which are incorporated herein by reference.

BACKGROUND

1. Field of the Invention

The present invention relates to a method and apparatus for determining an unknown radiation dose.

2. Related Art

Optically stimulated luminescence (OSL) readers are used to read OSL sensors that contain an OSL material (OSLM) that have been exposed to radiation, such as ionizing radiation. OSL readers using a pulsed optically stimulated luminescence (POSL) mode of operation have required high power YAG lasers, a complex optical system to control laser light intensity for the purpose of extending the dynamic range of dose measurements, sophisticated gating electronics, stand-alone photon counters and a personal computer with data acquisition boards for controlling the hardware and data processing. Such OSL readers are described in U.S. Pat. Nos. 5,892,234 and 5,962,857 to McKeever et al., the entire contents and disclosures of which are incorporated herein by reference.

SUMMARY

According to a first broad aspect, the present invention provides a method comprising the following steps: (a) illuminating an optically stimulated luminescence (OSL) sensor with illumination light from an LED for a first period of time based on a first number of clock cycles of a microprocessor, (b) counting photon pulses generated by a photodetector using the pulse counter for a second period of time after a delay time, (c) repeating steps (a) and (b) for a first predetermined number of measurement cycles, (d) the microprocessor determining a radiation dose for one type of ionizing radiation to which the OSL sensor has been exposed based on a number of photon pulses counted in step (b) after steps (a) and (b) have been repeated for the first predetermined number of measurement cycles, and (e) displaying the radiation dose to a user and/or saving the radiation dose to a storage medium, wherein photons of luminescent light emitted by the OSL sensor are registered by the photodetector, wherein the photon pulses generated by the photodetector are based on the photons of luminescent light registered by the photodetector, wherein the second period of time is based on a second number of microprocessor clock cycles after a delay time based on a third number of microprocessor clock cycles, wherein the delay time is based on a third number of microprocessor clock cycles, wherein OSL sensor has been subjected to a dose of the one type of ionizing radiation prior to step (a), wherein the luminescent light is emitted by the OSL sensor in response to step (a), and wherein the pulse counter is part of the microprocessor.

According to a second broad aspect, the present invention provides an apparatus comprising: an LED light source for emitting a green illumination light for illuminating an optically stimulated luminescence (OSL) sensor, a photodetector for detecting of green luminescent light emitted by the OSL sensor, a pulse counter for counting photon pulses generated by a photodetector based on photons of luminescent light emitted by the OSL sensor and counted by the photodetector, and a microprocessor for controlling the LED light source and the photodetector and the pulse counter, wherein the microprocessor controls when the LED light source, the photodetector and the pulse counter are switched between an on state and an off state, wherein the pulse counter is part of the microprocessor, and wherein the microprocessor determines a radiation dose of one type of ionizing radiation to which the OSL sensor has been exposed based on a number of photon pulses counted by the pulse counter.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the invention.

DETAILED DESCRIPTION OF THE PREFERRED EMBODIMENTS

Definitions

Figure 1:
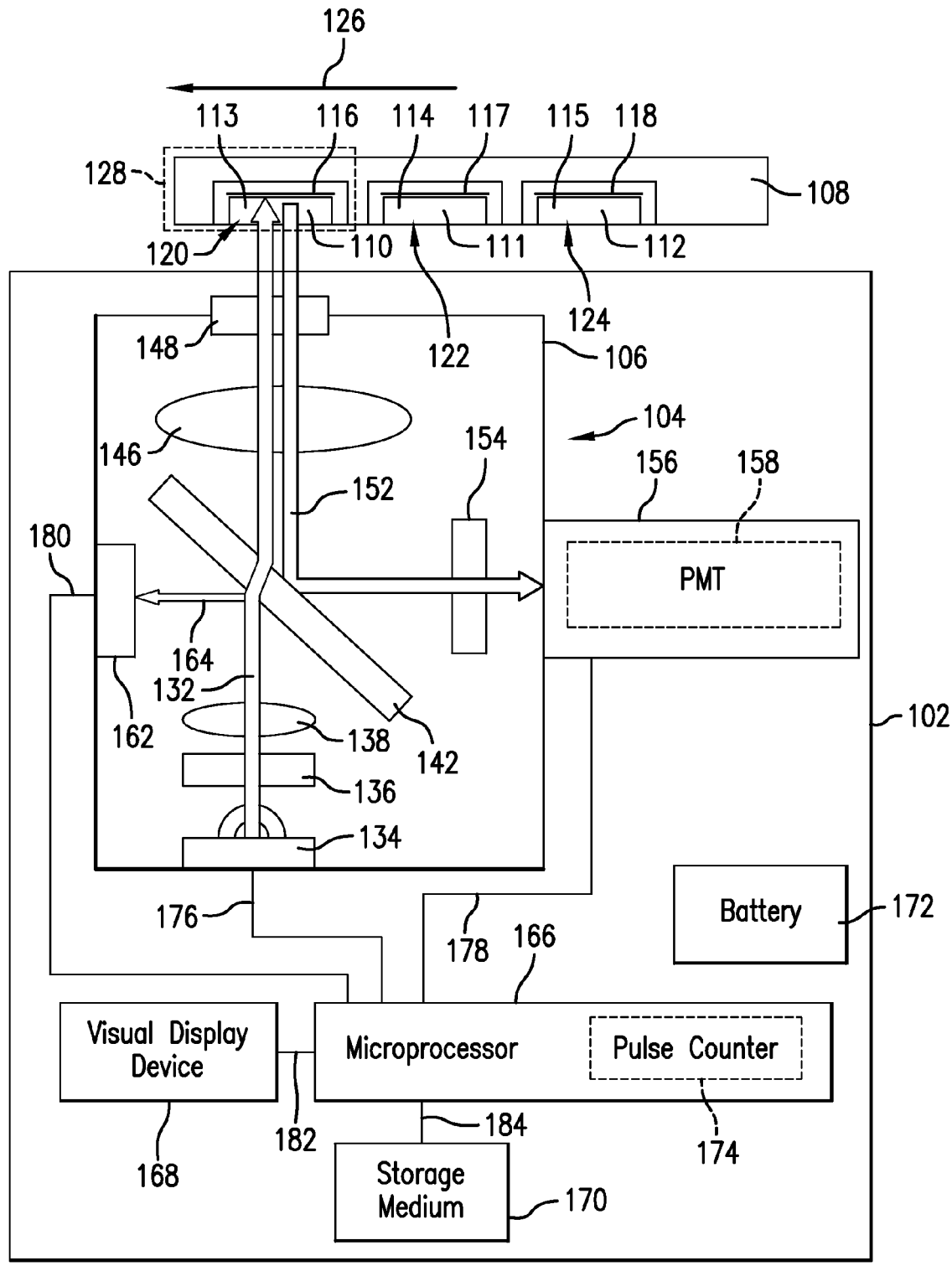
FIG. 1 is a schematic drawing of an OSL reader according to one embodiment of the present invention.

Where the definition of terms departs from the commonly used meaning of the term, applicant intends to utilize the definitions provided below, unless specifically indicated.

For purposes of the present invention, directional terms such as "top", "bottom", "upper", "lower", "above", "below", "left", "right", "horizontal", "vertical", "upward", "downward", etc., are merely used for convenience in describing the various embodiments of the present invention.

For purposes of the present invention, a value or property is "based" on a particular value, property, the satisfaction of a condition, or other factor, if that value is derived by performing a mathematical calculation or logical decision using that value, property or other factor.

For purposes of the present invention, the term "$Al_2O_3$ material" refers to a material that is mainly comprised of $Al_2O_3$. An example of an $Al_2O_3$ material is $Al_2O_3$:C ($Al_2O_3$ doped with carbon).

For purposes of the present invention, the term "computer" refers to any type of computer or other device that implements software including an individual computer such as a personal computer, laptop computer, tablet computer, mainframe computer, mini-computer, etc. A computer also refers to electronic devices such as a smartphone, an eBook reader, a cell phone, a television, a handheld electronic game console, a videogame console, a compressed audio or video player such as an MP3 player, a Blu-ray player, a DVD player, etc. In addition, the term "computer" refers to any type of network of computers, such as a network of computers in a business, a computer bank, the Cloud, the Internet, etc.

For purposes of the present invention, the term "delay time" refers to the time between when an OSL sensor is exposed to illumination light from an LED and when a photon counter starts counting the photons of the luminescent light emitted by the OSL sensor and registered (detected) by a photodetector. The luminescent light is emitted in response to the OSL sensor being exposed to illumination light. The delay time allows for the LED light used to illuminate the OSL sensor to decay completely. Having a delay time is important because it allows photodetector to relax after the exposure to a illumination light leaking through the optical filters and allows to reduce requirements to those optical filters with regards to absorption and transmission properties increasing this way the efficiency of luminescent light detection by the photodetector.

For purposes of the present invention, the term "dosimetric parameter" refers to the value or the number determined from processing of the luminescent signal obtained from irradiated luminescent material and is directly related to the dose of radiation absorbed by the radiation detector containing this luminescent material.

For purposes of the present invention, the term "dynamic range of dose measurements" refers to at least 5 orders (or decades) of magnitude of dose measurements dynamically adjustable by the reader software and hardware.

For purposes of the present invention, the term "hardware and/or software" refers to a device that may be implemented by digital software, digital hardware, or a combination of both digital hardware and digital software.

For purposes of the present invention, the term "heavy charged particle (HCP)" refers to nuclei or ions with masses equal to or greater than a proton. Some representative, but nonlimiting examples of heavy charged particles include: alpha particles, tritium ions, protons, recoil protons, etc.

For purposes of the present invention, the term "high speed" refers to radiation dose measurements for an OSL sensor being obtained by an OSL reader in less than five seconds.

For purposes of the present invention, the term "indirectly ionizing radiation" refers to electromagnetic radiation (like X-rays, gamma rays) or neutrons.

For purposes of the present invention, the term "ionizing radiation" refers to any particulate radiation that is capable of dissociating molecules into a positively and negatively charged ion pair or to remove an electron from an atom in gas, liquid or solid matter. The present invention may be used to determine doses of both directly ionizing radiation and indirectly ionizing radiation.

For purposes of the present invention, the term "irradiation" refers to the conventional meaning of the term "irradiation", i.e., exposure to high energy charge particles, e.g., electrons, protons, alpha particles, etc., or electromagnetic radiation of wave-lengths shorter than those of visible light, e.g., gamma rays, x-rays, ultraviolet, etc.

For purposes of the present invention, the term "low penetrating radiation" refers to radiation from heavy charged particles having penetration range that is less than 100 microns (100 μm) in a radiation sensing material or absorber. Examples of low penetrating radiation are: alpha particles, recoil protons, etc.

For purposes of the present invention, the term "low power" refers to low electrical power consumption by the OSL reader that can be provided but not limited by a low voltage and capacity on-board electrical power source like disposable or rechargeable batteries.

For purposes of the present invention, the term "machine-readable medium" refers to any mechanism that stores information in a form accessible by a machine such as a computer, network device, personal digital assistant, manufacturing tool, any device with a set of one or more processors, etc. For example, a machine-readable medium may be a recordable/non-recordable media (e.g., read-only memory (ROM), random access memory (RAM), magnetic disk storage media, optical storage media, flash memory devices, etc.), a bar code, an RFID tag, etc.

For purposes of the present invention, the term "measurement cycle" refers to the period of the operation performed by an OSL reader in measuring a radiation dose based on the emitted luminescent light from an OSLM caused by the OSLM being stimulated by one pulses of stimulating light from a light source, such as an LED light source.

For purposes of the present invention, term the "microprocessor" refers to a computer processor contained on an integrated circuit chip, such a processor may also include memory and associated circuits. A microprocessor may further comprise programmed instructions to execute or control selected functions, computational methods, switching, etc. Microprocessors and associated devices are commercially available from a number of sources, including, but not limited to, Cypress Semiconductor Corporation, IBM Corporation, Applied Microsystems Corporation, Intel Corporation, Microchip Technology, ARM Ltd. etc.

For the purposes of the present invention, the term "normal number of measurement cycles" refers to the number of measurement cycles used by an OSL reader when the OSL readers uses a high dose mode to measure the radiation dose for an OSL sensor. In one embodiment of the present invention, when an OSL reader conducts test measurements on an OSL sensor do determine if the OSL reader should use a high dose mode or a low dose mode to determine the radiation dose for the OSL sensor, test measurements are conducted in a high dose mode for a number of measurement cycles that is less than the normal number of measurement cycles.

For purposes of the present invention, the term "on-board" refers to a device or component that is physically part of an OSL reader.

For purposes of the present invention, the term "on state" refers to a device, such as an LED source being turned on.

For purposes of the present invention, the term "off state" refers to a device, such as an LED source being turned off.

For purposes of the present invention, the term "OSLM" refers to an OSL material, i.e., a material whose exposure to radiation may be determined using optically stimulated luminescence techniques. An $Al_2O_3$ material, such as an $Al_2O_3$:C, is an example of an OSLM. The amount of radiation exposure that an $Al_2O_3$ material has received may be measured by stimulating the Al2O3 material with green light from either a laser or light emitting diode source. The resulting blue light emitted from the $Al_2O_3$ is proportional to the amount of radiation exposure and the intensity of stimulation light. Both high and low-energy photons and beta particles can be measured with this technique. For more information on OSL materials and systems, see, U.S. Pat. No. 5,731,590 issued to Miller; U.S. Pat. No. 6,846,434 issued to Akselrod; U.S. Pat. No. 6,198,108 issued to Schweitzer et al.; U.S. Pat. No. 6,127,685 issued to Yoder et al.; U.S. patent application Ser. No. 10/768, 094 filed by Akselrod et al.; all of which are incorporated herein by reference in their entireties. See also Optically Stimulated Luminescence Dosimetry, Lars Botter-Jensen et al., Elesevier (2003); Klemic, G., Bailey, P., Miller, K., Monetti, M. External radiation dosimetry in the aftermath of radiological terrorist event, Rad. Prot. Dosim., 120 (1-4): 242-249 (2006); Akselrod, M. S., Kortov, V. S., and Gorelova, E. A., Preparation and properties of $Al_2O_3$:C, Radiat. Prot. Dosim. 47, 159-164 (1993); and Akselrod, M. S., Lucas, A. C., Polf, J. C., McKeever, S. W. S. Optically stimulated luminescence of $Al_2O_3$:C, Radiation Measurements, 29, (3-4), 391-399 (1998), all of which are incorporated herein by reference in their entireties.

For purposes of the present invention, the term "OSL reader" refers to a device that emits a wavelength of light that stimulates an OSLM in an OSL sensor to emit light. Under a specified stimulation regime (continuous stimulation of particular wavelength and intensity, and pulsed stimulation with various pulse durations, pulse frequency, pulse shape and time between pulses) the intensity of the emitted luminescent light is proportional to the radiation exposure in a range from about 0.01 mGy (1 mrad) to over about 100 Gy (10,000 rads).

For purposes of the present invention, the term "OSL sensor" refers to a radiation sensor that is made from or includes an OSLM. OSL sensors may be read using an OSL reader. One or more OSL sensors may be part of a radiation dosimeter and/or a dosimeter sled. Examples of radiation dosimeters and dosimeter sleds including OSL sensors are described and shown in U.S. Pat. No. 8,373,142 to Yoder et al., entitled, "DOSIMETER SLED," issued Feb. 12, 2013.

For purposes of the present invention, the term "penetrating photon radiation" refers to short wavelength electromagnetic radiation with energies equal to or higher than 10 keV as might originate from radioactive nuclear decay, from space or produced by accelerating or decelerating of charge particles, for example, in an X-ray machine or in an accelerator.

For purposes of the present invention, the term "penetrating beta radiation" refers to electrons with energies equal to or greater than 10 keV as might originate from radioactive nuclear decay, from space, produced by radiation-induced ionization of atoms or by acceleration in an electric field.

For purposes of the present invention, the term "photon pulses" refers to pulses generated by a photomultiplier tube (PMT) based on the photons of luminescent light counted by the PMT. In one embodiment of the present invention, these photon pulses are counted by a pulse counter of a microprocessor.

For purposes of the present invention, the term "processor" refers to a device capable of, for example, executing instructions, implementing logic, calculating and storing values, etc. Exemplary processors may include application specific integrated circuits (ASIC), central processing units, microprocessors, such as, for example, microprocessors commercially available from Intel and AMD, etc.

For purposes of the present invention, the term "pulsed optically stimulated luminescence" refers to a technique of reading an OSL sensor by stimulating the OSL material in the OSL sensor using a continuous stream of short (i.e. less than the luminescence lifetime) pulses of light, such as laser light or LED light, measuring the emitted light from the OSL sensor only between pulses within the stream, with a certain delay after each stimulation pulse. Pulsed optically simulate luminescent (POSL) techniques may be used in reading OSL sensor having OSL materials having a relatively long-lived luminescence (i.e. tens of microseconds to tens of milliseconds). An important element in POSL is the choice of a laser or LED pulse width which is significantly shorter than the lifetime of the OSL emission from the OSL material.

For purposes of the present invention, the term "radiation dose" refers to the value of the radiation dose for a particular type of radiation to which an OSL sensor has been exposed.

For purposes of the present invention, the term "radiation dosimetry" refers to the conventional meaning of the term "radiation dosimetry", i.e., the measurement of the amount of radiation dose absorbed in a material, an object or the body of an individual.

For purposes of the present invention, the term "radiation sensing material" refers to a material used to sense radiation in a radiation sensor. Examples of radiation sensitive materials including optically stimulated luminescent materials for OSL sensors, thermoluminescent materials for thermoluminescent dosimetry (TLD) sensors, etc.

For purposes of the present invention, the term "reading position" refers to an OSL sensor that is in a position relative to the optical engine of the OSL reader that allows the OSL sensor to be read by the OSL reader For purposes of the present invention, the term "saturation of a photodetector" refers to the condition of a photodetector at which further increase of input light intensity does not result in proportional increase of the photodetector output signal.

For purposes of the present invention, the term the term "storage medium" refers to any form of storage that may be used to store bits of information. Examples of storage include both volatile and non-volatile memories such as MRRAM, MRRAM, ERAM, flash memory, RFID tags, floppy disks, Zip™ disks, CD-ROM, CD-R, CD-RW, DVD, DVD-R, flash memory, hard disks, optical disks, etc.

For purposes of the present invention, the term "visual display device," the term "visual display apparatus" and the term "visual display" refer to any type of visual display device or apparatus such as a an LCD screen, touchscreen, a CRT monitor, LEDs, a projected display, a printer for printing out an image such as a picture and/or text, etc. A visual display device may be a part of another device such as a computer monitor, television, projector, cell phone, smartphone, laptop computer, tablet computer, handheld music and/or video player, personal data assistant (PDA), handheld game player, head mounted display, a heads-up display (HUD), a global positioning system (GPS) receiver, automotive navigation system, dashboard, watch, microwave oven, electronic organ, automated teller machine (ATM), etc.

DESCRIPTION

In one embodiment, the present invention provides a method and apparatus for fast determination of radiation dose using battery powered and portable POSL reader equipped with low power microprocessor. The purpose of the invention is to determine radiation dose from a detector utilizing Pulsed Optically Stimulated Luminescence through sequential execution of microprocessor commands. It is an improvement over previously developed OSL reader.

In one embodiment, the present invention improves upon prior CW readers by performing POSL measurements with a compact, battery operated instrument that does not require a PC for control and data processing. The instrument is portable and self-contained. Previous readers required a desktop or laptop PC to operate and were much larger and heavier making field measurements difficult or impossible. Previous readers used CW mode which is not as sensitive or accurate.

Field POSL measurements of radiation dose can be determined without use of a PC or power source other than self-contained batteries. The instrument may be used to record multiple measurements to be uploaded later to a database. The POSL method and apparatus (reader) can read the same detector multiple times with high signal-to-noise ratio, low depletion per read, and high reliability.

FIG. 1 shows OSL reader 102 according one embodiment of the present invention. OSL reader 102 includes an optical engine 104. Optical engine 104 includes an optical engine frame 106 on which and in which various components of optical engine 104 are mounted. In FIG. 1, optical engine 104 is shown being used to read a dosimeter sled 108 including three OSL sensors, i.e., OSL sensors 110, 111 and 112. OSL sensors 110, 111 and 112 include respective OSLM discs 113, 114 and 115 and respective reflective backings 116, 117 and 118. OSLM discs 113, 114 and 115 have respective exposed sides 120, 122 and 124. To allow each OSL sensor of dosimeter sled 108 to be read by OSL reader 102, dosimeter sled 108 is moved as shown by arrow 126 to a reading position 128 in OSL reader 102. In FIG. 1, OSL sensor 110 is a reading position 128, shown as a dashed box. A green stimulation light 132 from an LED 134 is transmitted through a long-wavelength-pass filter 136 and directed to a condenser lens 138. Long-wavelength-pass filter 136 filters out non-green light from green stimulation light 132, i.e., long-wavelength-pass filter 136 is a yellow filter that passes green light and absorbs or reflects blue light. Condenser lens 138 is positioned so that condenser lens 138 collects and collimates green stimulation light 132. Green stimulation light 132 is further transmitted through a dichroic mirror 142. Green stimulation light is further focused by a collection lens 146 and is directed through a window 148 and towards the OSL sensor that is currently in a reading position. When the OSL sensor in reading position 128 is exposed to green stimulation light 132, blue luminescent light 152 is emitted from the OSL sensor. Blue luminescent light is transmitted through window 148 and collected and focused by collection lens 146. Blue luminescent light 152 is then reflected by dichroic mirror 142 at a 90 degree angle through a blue filter 154. Blue filter 154 filters out non-blue light from blue luminescent light 152, i.e., filter 154 is a blue band-pass filter that passes only blue light and rejects other wavelengths of light. After passing through blue filter 154, blue luminescent light is registered (detected) by photodetector 156 that contains photomultiplier tube (PMT) 158. PMT 158, operating in a photon counting mode, quantifies the luminescence generated in the OSL sensor, collected by the optical system and registered by the photodetector as a radiation induced blue luminescent light 152. A photodiode 162 is located directly opposite photodetector 156. A portion 164 of green stimulation light 132 is reflected by dichroic mirror 142 and is detected by photodiode 162, thereby allowing the intensity of green stimulation light 132 to be measured. OSL reader 102 includes a microprocessor 166, a visual display device 168, a storage medium 170 and a battery 172. Microprocessor 166 includes a pulse counter 174 that counts photon pulses generated by PMT 158 based on the photons of luminescent light counted by PMT 158. Microprocessor 166 is in electrical and data communication with LED 134, photodetector 156, photodiode 162, visual display device 168 and storage medium 170 as indicated by connection 176, 178, 180, 182 and 184, respectively. Connection 178 between microprocessor 166 and photodetector 156 allows photodetector 156 to communicate with pulse counter 174. Additional electrical and/or data communication connections exist in OSL reader 102, but only some of these electrical and/or data connections are show in FIG. 1 for simplicity of illustration. For example, electrical connections exist, not shown in FIG. 1, between battery 172 and all of the components of OSL reader 102, such as LED 134, photodetector 156, photodiode 162, visual display device 168 and storage medium 170, etc. that are supplied with power by battery 172. Also, storage medium 170 may be in electrical and/or data communication with other components of OSL reader 102 in addition to microprocessor 166.

Although for simplicity of illustration in FIG. 1 the stimulation light and luminescent light are shown as being in parallel, the stimulation light and luminescent light are actually in alignment and both the stimulation light and luminescent light pass through the center of the window and collection lens of the OSL reader. Also, although the stimulation light is shown only covering a portion of the OSLM disc of the OSL sensor being read, the stimulation light may illuminate all or part of the exposed side of the OSLM disc. In addition, although the luminescent light is shown being emitted by portion of the OSLM disc of the OSL sensor being read, the luminescent light actually may be emitted from a portion or all of the exposed side of the OSLM disc.

The dichroic mirror in FIG. 1 is positioned at 45 degrees with respect to both the green stimulation light emitted from the LED and the blue luminescent light emitted from the OSL sensor.

In one embodiment, the present invention provides a method for fast determination of an unknown radiation dose utilizing a Pulsed Optically Stimulated Luminescence (POSL) technique. In one embodiment, the present invention provides a battery operated portable OSL reader having a high speed and low power consuming microcontroller (microprocessor) performing measurements through fast sequential code execution.

Figure 2:
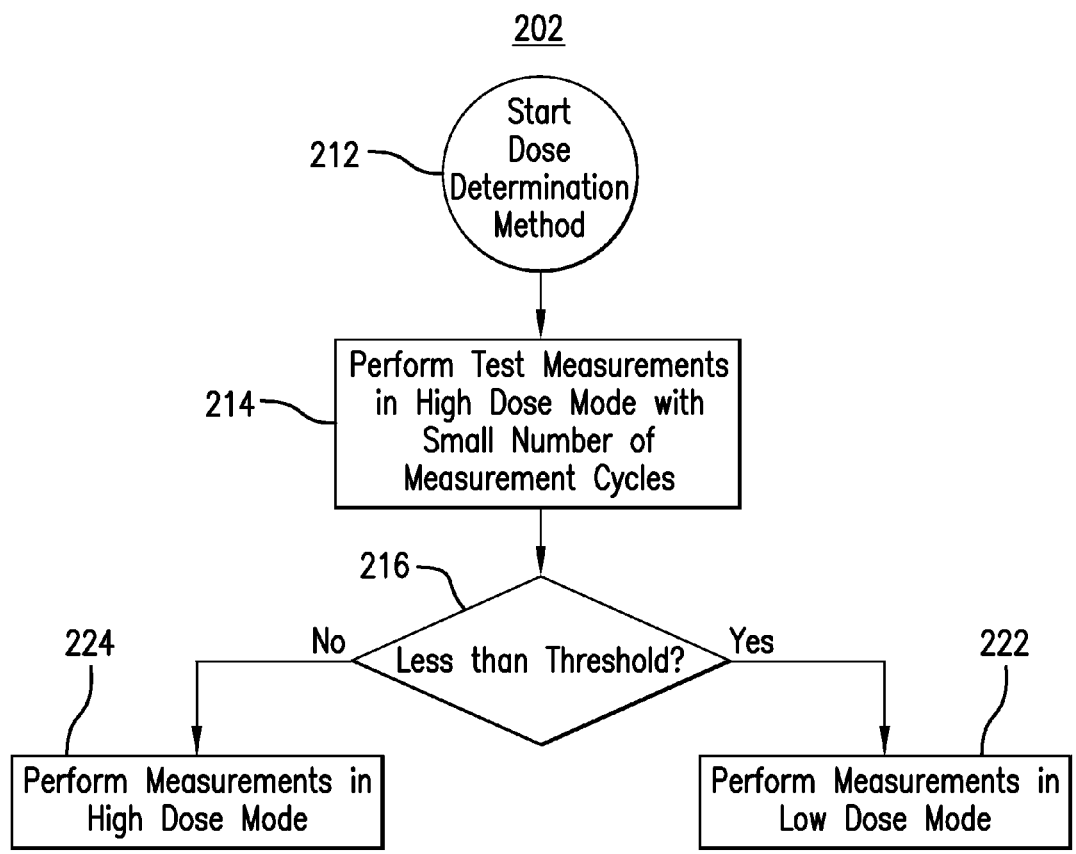
FIG. 2 is flowchart of a dose determination method for determining an unknown radiation dose according to one embodiment of the present invention.
Figure 3:
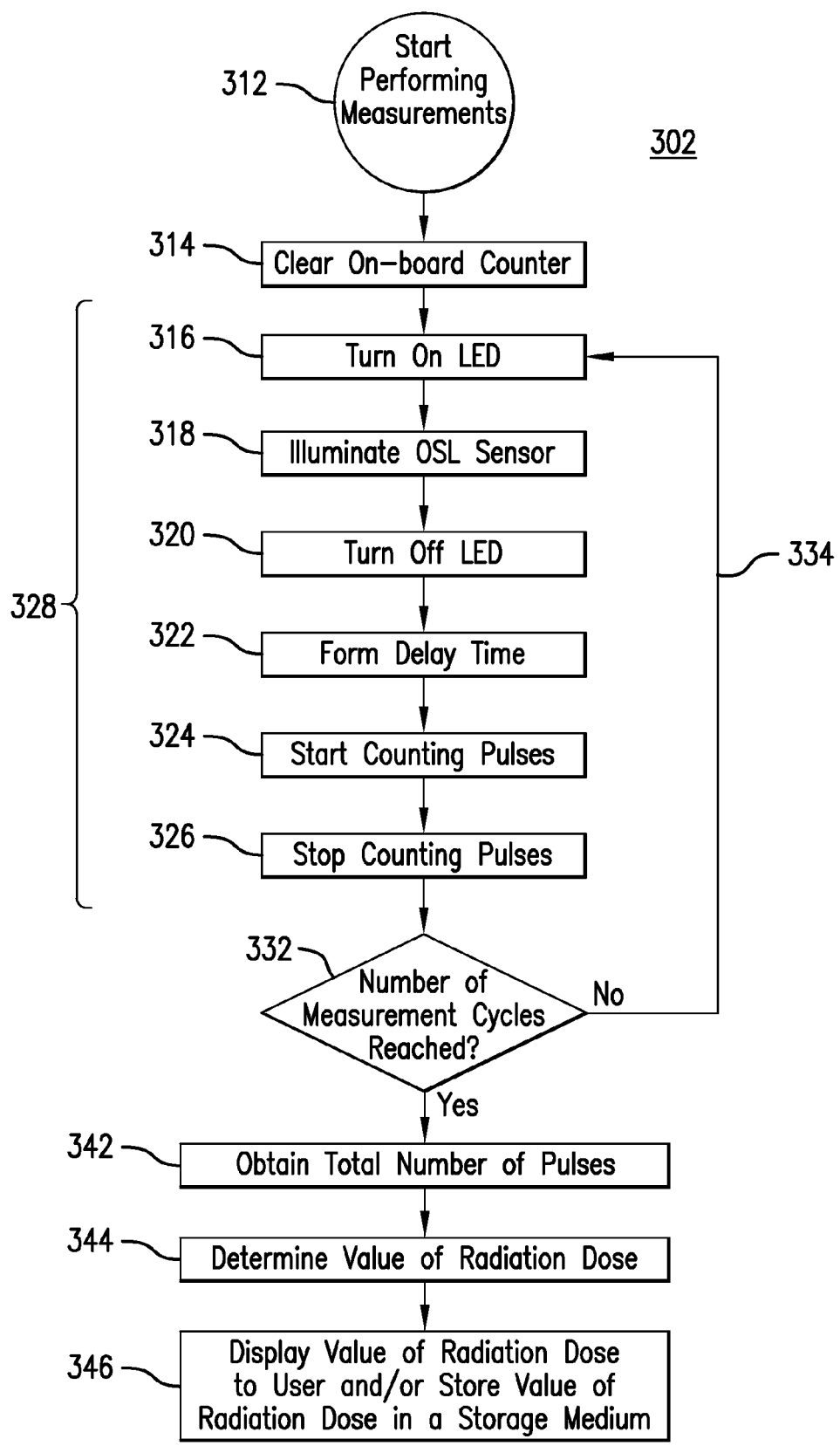
FIG. 3 is a flowchart showing a measurement method that may be used in dose determination method of FIG. 3.

FIG. 2 illustrates a dose determination method 202 or determining an unknown radiation dose according to one embodiment of the present invention. Method 202 is started at step 212 using an OSL reader, such as the OSL reader of FIG. 1. At step 214, test measurements are performed on an OSL sensor in a high dose mode for a small, predetermined number of measurement cycles, such as 20 to 100 measurement cycles. During step 214 the OSL sensor is exposed to pulses of stimulation light from an LED light source of the OSL reader causing the OSLM of the OSL sensor to emit photons of luminescent light. These emitted photons of luminescent light are registered by a PMT of a photodetector of the OSL reader. Based on the number of photons registered, the PMT generate photon pulses that are counted by a pulse counter of a microprocessor of the OSL reader. At step 216, the microprocessor of the OSL reader determines if the total number of photon pulses counted is less than a threshold parameter. If the total number of photon pulses is less than the threshold parameter, the OSL reader performs measurements in a low dose mode at step 222. If the total number of photon pulses is equal or greater than the threshold parameter, the OSL reader performs measurements in a high dose mode at step 224. In high dose mode, the LED pulse width is shorter and the spacing of pulses, i.e., time between pulses, is longer. In low dose mode, the LED pulse width is longer and the spacing of pulses, i.e., time between pulses, is shorter. Measurements of a radiation dose are performed in high dose mode or low dose mode to ensure that the number of photons being registered in particular period of time is within the dynamic range of the PMT. For example, using longer spacing in high dose mode prevents the number of photons registered by the PMT over a given period of time from exceeding the dynamic range of the PMT. In contrast, by shortening the spacing in low dose mode ensures that the number of photons registered by the PMT over a period of time corresponds to the number of photons emitted by the OSL sensor and is not significantly affected by stray photons from other sources. The steps of the measurement method in high dose mode and the low dose mode are essentially the same and are shown in FIG. 3. The particular threshold parameter, the pulse width and pulse spacing used for the high dose mode and the pulsed width and pulse spacing used for the high dose mode used in method 302 will depend on various factors including the required dose range of measurements, amount of OSL material in the sensor, desired OSL sensor depletion rate, dynamic range of the PMT used in the OSL reader, the type of OSL sensor used, the design of the optical engine, the light power of the light source (LED), etc.

FIG. 3 illustrates a method 302 for performing measurements according to one embodiment of the present invention for determining the radiation dose to which an OSL sensor has been exposed. Method 302 may be performed in either high dose mode or low dose mode. The steps of method 302 are performed by an OSL reader, such as the OSL reader of FIG. 1, which includes an LED light source for generating illumination light, a photodetector for detecting photons of luminescent light emitted by the OSL sensor after being exposed to the illumination light, a microprocessor and a pulse counter that is part of the microprocessor. An example of such an OSL reader is shown in FIG. 1. At step 312, method 302 is started by a user initiating the reading of the OSL sensor in a reading position by the OSL reader or by the OSL reader sensing that the OSL sensor is in a reading position using an "end switch" or a position sensor. A user may initiate the reading of the OSL sensor by pressing a button on the OSL reader, flipping a switch on the OSL reader, selecting a menu item on visual display, such as a touchscreen, of the OSL reader, etc. At step 314, the microprocessor clears the pulse counter of all previously acquired data. At step 316, the microprocessor executes an instruction to turn on the LED light source of the OSL reader to thereby generate illumination light. At step 318, the OSL sensor is illuminated by illumination light from the OSL reader for a predetermined period of time defined by the value of a first parameter equal to the predefined number of microprocessor clock cycles for the microprocessor. At step 320, the microprocessor executes an instruction to turn off the LED light source. At step 322, the microprocessor executes a delay time defined by the value of a second parameter equal to the number of microprocessor clock cycles that allows the illumination from the LED light source to decay completely. At step 324, the microprocessor executes a command to start counting photon pulses, based on the number of photons registered by the photodetector, using the on-board pulse counter for a predetermined period of luminescence counting time defined by the value of a third parameter equal to the number of microprocessor clock cycles. At step 326, the microprocessor executes a command to have on-board pulse counter stop counting photon pulses generated by the photodetector.

Together, steps 316, 318, 320, 322, 324 and 326 constitute a measurement cycle 328. At step 332, the microprocessor determines if measurement cycle 328 has been conducted a predetermined number of times, defined by the value of a fourth parameter. If measurement cycle 328 has not been conducted the predetermined number of times, measurement cycle 328 is restarted at step 328 as indicated by arrow 334. If measurement cycle 328 has been conducted the predetermined number of times, the microprocessor obtains the total number of single photon pulses from on-board pulse counter accumulated during the execution of the predetermined number of measurement cycles at step 342. At step 344, the microprocessor uses a mathematical dose calculation algorithm to calculate a value of the radiation dose based the accumulated number of single photon pulses stored in the on-board pulse counter and based on the value of a fifth parameter and the value of a sixth parameter determined during the calibration of the OSL reader. The fifth parameter is a sensitivity relating to the number of single photon pulses per unit of radiation dose in low dose range of measurements and is determined during the OSL reader calibration procedure for each type of radiation. The sixth parameter is a sensitivity relating to the number of single photon pulses per unit of radiation dose in high dose range of measurements and is determined during the OSL reader calibration procedure for each type of radiation. Low and high dose range of measurements are differentiated by the values of the first parameter—duration of LED pulse (steps 316, 318, 320), the third parameter—duration of the single photon counting time (steps 324 and 326), and the fourth parameter—number of measurement cycles. Two ranges of dose measurements and two sets of first, third and fourth parameters are used to extend the dynamic range of dose measurements performed by the OSL reader, to avoid the saturation of the photodetector (PMT) by high intensity luminescent emission from an OSL sensor irradiated with high radiation dose, and finally to control the amount of depletion per one readout of the OSL sensor.

At step 346, the value of radiation dose is displayed to a user on a visual display device and/or the value of the radiation dose is stored in a storage medium. The storage medium may be either part of the OSL reader or may be an external storage medium, such as a flash drive, connected to the OSL reader.

The values of the various parameters may be based on calibration tests, these values might be stored in a microprocessor flash memory as configuration file, in microprocessor software code and can be entered or modified by an authorized user, etc.

In one embodiment of the present invention, to avoid saturation of the photodetector, the dynamic range of dose measurements may be increased. In order to increase the dynamic range, the mode of measurement corresponding to "low" and/or "high" are defined by performing a series of a steps. During calibration of the OSL reader measurements of a series of calibration OSL sensors are performed with the value of the first parameter of step 318 of method 302 defining the LED illumination time (equal to a predefined number of microprocessor clock cycles) and the fourth parameter equal to the number of measurement cycles conducted, are set to values smaller, whereas the value of the third parameter defining the photon counting time and equal to a predefined number of microprocessor clock cycles (steps 324 and 326) is set to larger value than the values of these three parameters during measurements in the low range of radiation doses. The total number of photon pulses counted by the pulse counter, i.e., the number of accumulated photon pulses, are compared with the value of a seventh parameter, i.e., a dose range threshold parameter, to determine the set of parameters to be used in dose measurements of method 302. If the number of accumulated photon pulses is smaller than the value of the dose threshold parameter, the first parameter of step 318, equal to the period of time that OSL sensor is illuminated as number of microprocessor clock cycles, and the value of the fourth parameter, equal to the number of measurement cycles conducted, are set to large values and the third parameter to a smaller value corresponding to a low dose range. In one embodiment of the present invention, a "low dose mode" value for the first parameter may be a value equal or exceeding 15 µs. In one embodiment of the present invention, a "low dose mode" value for the fourth parameter (number of cycles) may be 300 to 1000. In yet another embodiment of the present invention, a "low dose mode" the value for the third parameter may be equal or less than 1000 µs. If the number of accumulated photon pulses is larger than the value of the seventh parameter (dose threshold parameter), the first parameter of step 318, equal to the period of time that OSL sensor is illuminated as number of microprocessor clock cycles, and the value of the fourth parameter, equal to the number of measurement cycles conducted, are set to small values, whereas the value of the third parameter (photon counting time) is set to a larger value corresponding to a "high dose range". In one embodiment of the present invention, a small value for the first parameter may be equal to or less than 3 µs. In one embodiment of the present invention, a small value for the fourth parameter may be from 100 to 400 and the value of the third parameter may be from 2,000 to 10,000 µs.

Figure 9:
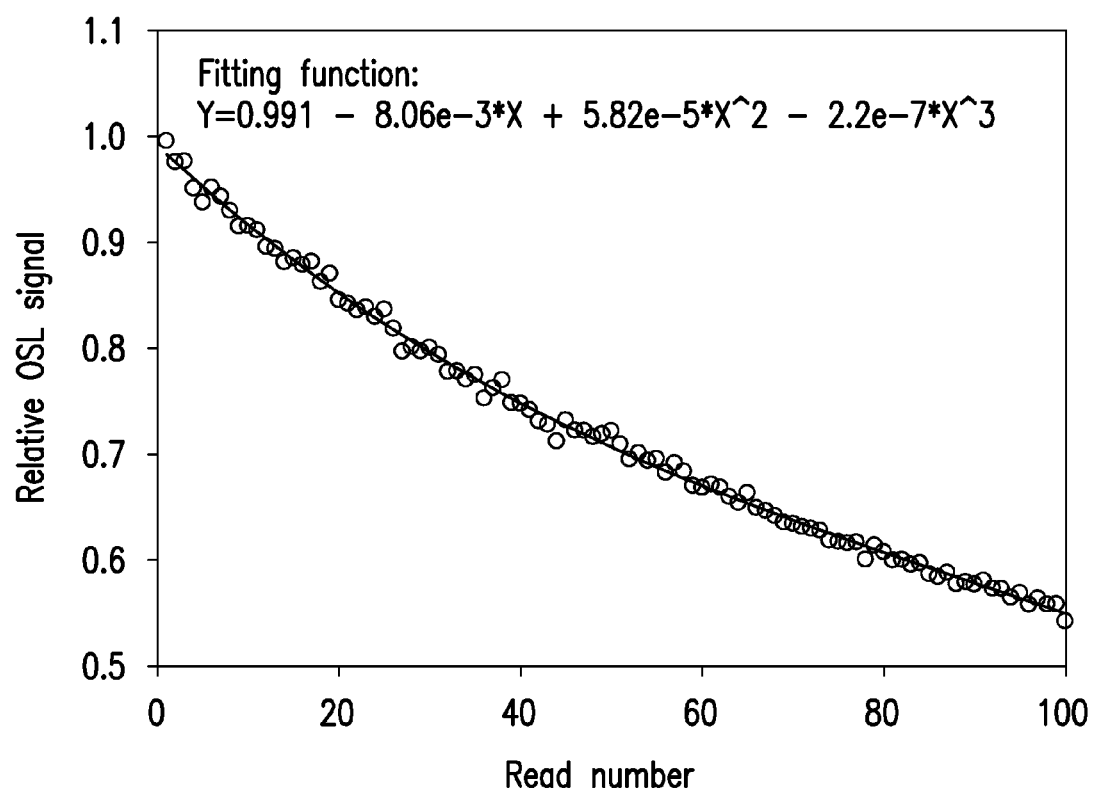
FIG. 9 is a graph illustrating the depletion of the OSL signal in Low Dose mode of measurements and is plotted as a function of readout number.
Figure 10:
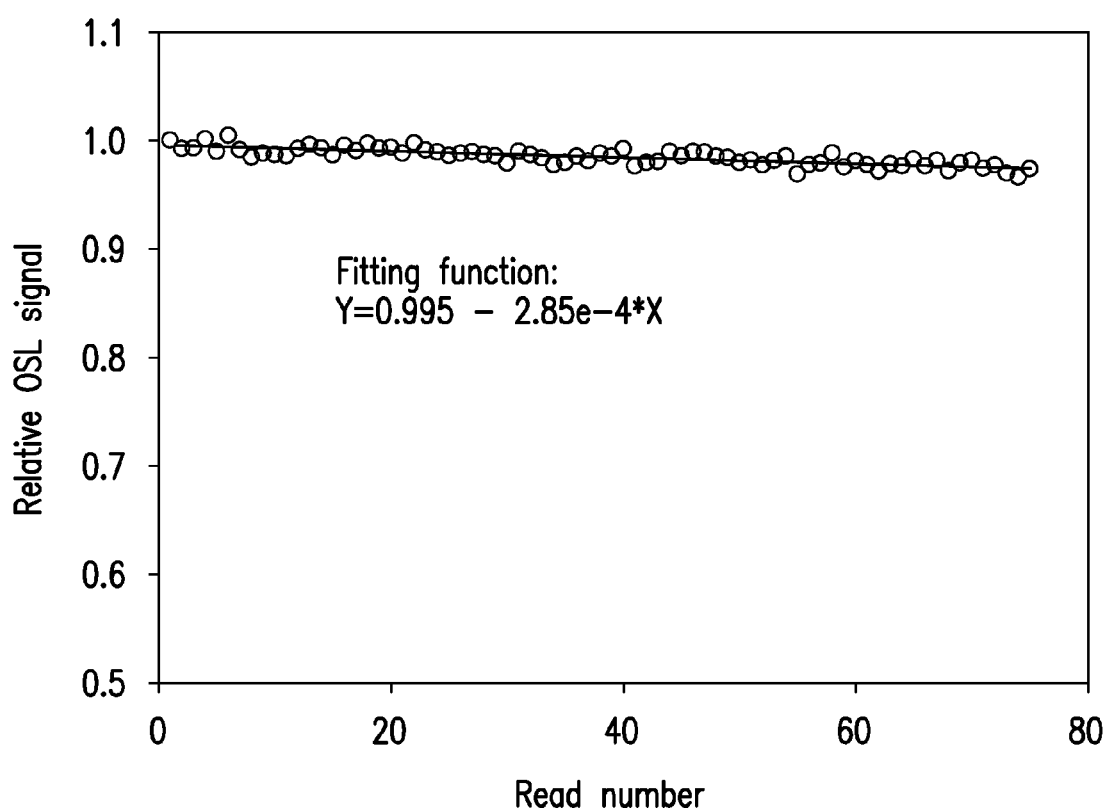
FIG. 10 is a graph illustrating the depletion of the OSL signal in High Dose mode of measurements and is plotted as a function of readout number.

In one embodiment of the present invention, measurements of irradiated OSL sensor may be performed multiple times using predetermined parameters one through seven and results of dose calculation are corrected by the eighth and ninth parameters of OSL measurements—depletion factors, determined during calibration of the OSL reader. The eighth parameter is the depletion factor for low dose mode and the ninth parameter is a depletion factor for a high dose mode. A depletion factor is a fraction of luminescent signal (total number of photon counts) been lost during one OSL readout process. When the OSL readout process of the same OSLM sensor repeated multiple times the total amount of depleted luminescent signal during each read has to be added to the last measured OSL signal to correctly calculate the radiation dose. Depletion factors for low and high dose ranges are different (high dose range depletion factor being lower) and are determined during the OSL reader calibration. The depletion can be defined by a single parameter or more precisely as a correction function. The examples of depletion curves and their fitting correction functions used for determining of depletion factors and dose correction as function of the readout number are illustrated by FIGS. 9 and 10.

In one embodiment of the present invention, an OSL reader may be calibrated using OSL sensor irradiated with known doses of radiation to determine the values of the first, second, third, fourth, fifth, sixth, seventh and eighth parameters.

In one embodiment of the present invention, the value of the first parameter defining LED pulse duration may be in the range of 1 µs to 100 us. In one embodiment of the present invention, the value of the first parameter defining the LED pulse duration in low dose range is a value equal or exceeding 15 µs. In one embodiment of the present invention, the value of the first parameter defining the LED pulse duration in high dose range is a value equal to or exceeding 3 µs.

In one embodiment of the present invention, the value of the second parameter defining the delay time after LED illumination may be in the range of 10 us to 50 us. In one embodiment of the present invention, the value of the second parameter defining the delay time after LED illumination is equal to 15 µs.

In one embodiment of the present invention, the value of the third parameter defining the period of luminescence counting time may be in the range of 100 µs to 10,000 µs. In one embodiment of the present invention, the value of the third parameter defining the period of luminescence counting time is equal to 1000 µs In one embodiment of the present invention, the value of the fourth parameter defining the number of illumination and luminescent measurement cycles is in the range 100 to 3000 cycles. In one embodiment of the present invention, the value of the fourth parameter defining the number of illumination and luminescent measurement cycles is equal to 1000 cycles.

In one embodiment of the present invention, the value of the fifth parameter defining the sensitivity factor for low dose range of measurements is in the range of 0.5 to 200 counts per 1 mrad of dose. In one embodiment of the present invention, the value of the fifth parameter defining the sensitivity factor for low dose range of measurements is equal to 2 counts per 1 mrad of dose.

In one embodiment of the present invention, the value of the sixth parameter defining the sensitivity factor for high dose range of measurements is in the range of 0.01 to 2 counts per 1 mrad of dose. In one embodiment of the present invention, the value of the sixth parameter defining the sensitivity factor for high dose range of measurements is equal 0.05 counts per 1 mrad of dose.

In one embodiment of the present invention, the value of the seventh parameter defining the number of accumulated single photon pulses as the threshold value between low and high range of doses obtained during preliminary measurements is in the range of 1,000 to 20,000 counts. In one embodiment of the present invention, the value of the seventh parameter defining the number of accumulated single photon pulses as the threshold value between low and high range of doses obtained during preliminary measurements is equal to 5000.

In one embodiment of the present invention, the value of the eighth parameter defining the depletion of OSL signal for multiple measurements in the low dose mode is in the range of 0.01% to 20% per one dosimeter reading. In one embodiment of the present invention, the value of the eighth parameter defining the depletion of OSL signal for multiple measurements is equal to 0.5% per one dosimeter reading.

In one embodiment of the present invention, the value of the eighth parameter defining the depletion of OSL signal for multiple measurements in the High Dose mode is in the range of 0.005% to 0.2% per one dosimeter reading. In one embodiment of the present invention, the value of the eighth parameter defining the depletion of OSL signal for multiple measurements is equal to 0.03% per one dosimeter reading.

In one embodiment, the present invention provides an OSL reader for fast radiation dose measurement of an OSL sensor irradiated to an unknown radiation dose, using a microprocessor to control the operation of various components of the OSL reader, including the components of an optical engine such as an LED light source, a photodetector, a photodiode, etc. The microprocessor includes a pulse counter for counting single photon pulses generated by the photodetector based on the photodetector registering photons of the luminescent signal. The microprocessor may also include an analog-to-digital converter for acquiring and processing analog signals The microprocessor may also control a visual display, such as an LED display or touchscreen for displaying the values parameters for the OSL reader, information relating to the operation of the instrument, results of dose measurements of OSL sensors, etc.

The OSL reader may include one or more input devices that allow a user to operate the OSL reader and/or obtain information from the OSL reader by means of the visual display of the OSL reader. The input devices may be pushbuttons, keys, etc. In one embodiment the input device may be a touchscreen that may also be the main visual display for the OSL reader. A user may use the input devices to change the various parameters of the OSL reader. The OSL reader may include a storage device such as a hard drive, flash drive, etc. The OSL reader may also include one or more components for external data communication such as a USB port, an RFID tag, an Ethernet port, a wireless receiver and/or transmitter such as a Wi-Fi receiver and/or transmitter, etc. that allows data to be transferred from the OSL reader to another device such as a laptop, smartphone, tablet computer etc., and from another device, such as a laptop, smartphone, tablet computer, etc., to the OSL reader.

In one embodiment, the present invention provides a portable OSL reader that includes a battery as a power source. The battery may be removable and/or rechargeable.

In one embodiment of the present invention, the case of the OSL reader may be shaped to make it easy to hold in one hand.

Figure 4:
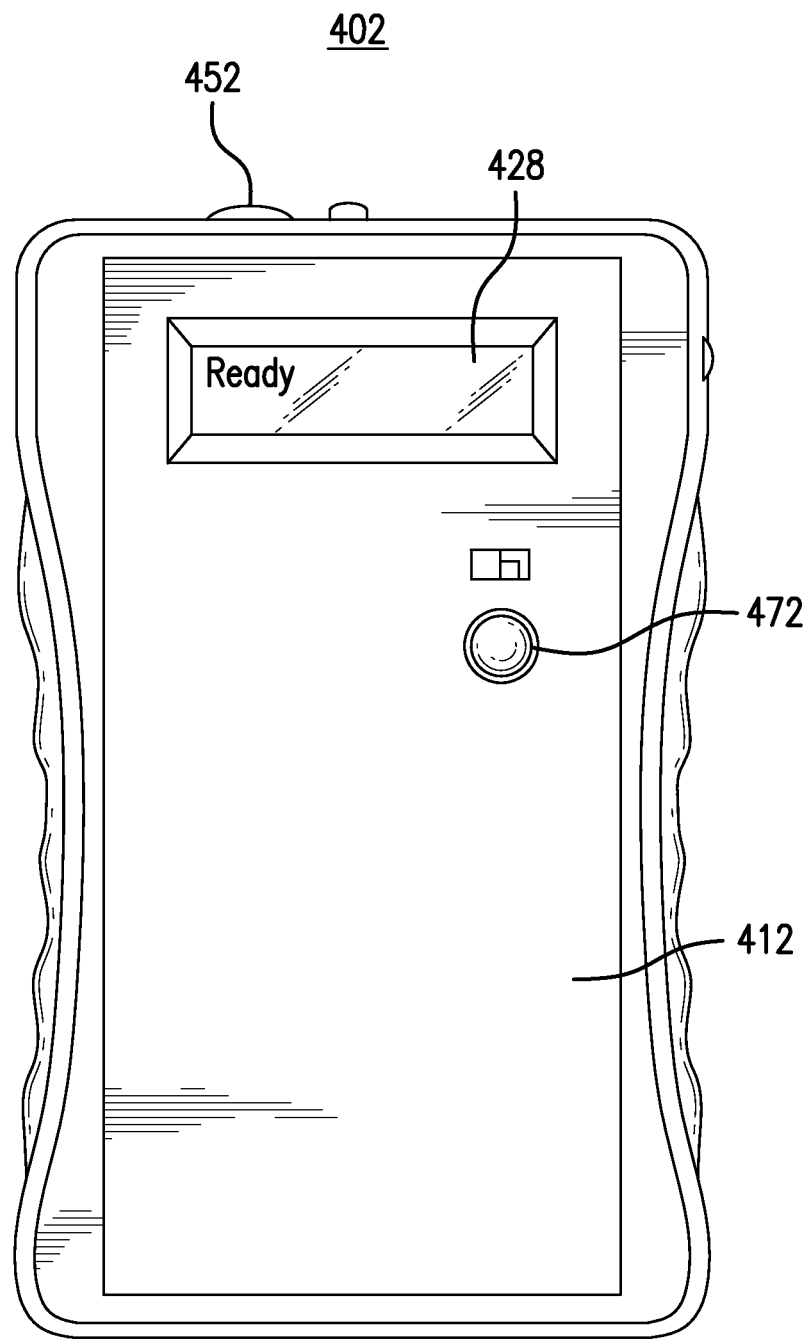
FIG. 4 shows an OSL reader according to one embodiment of the present invention.
Figure 5:
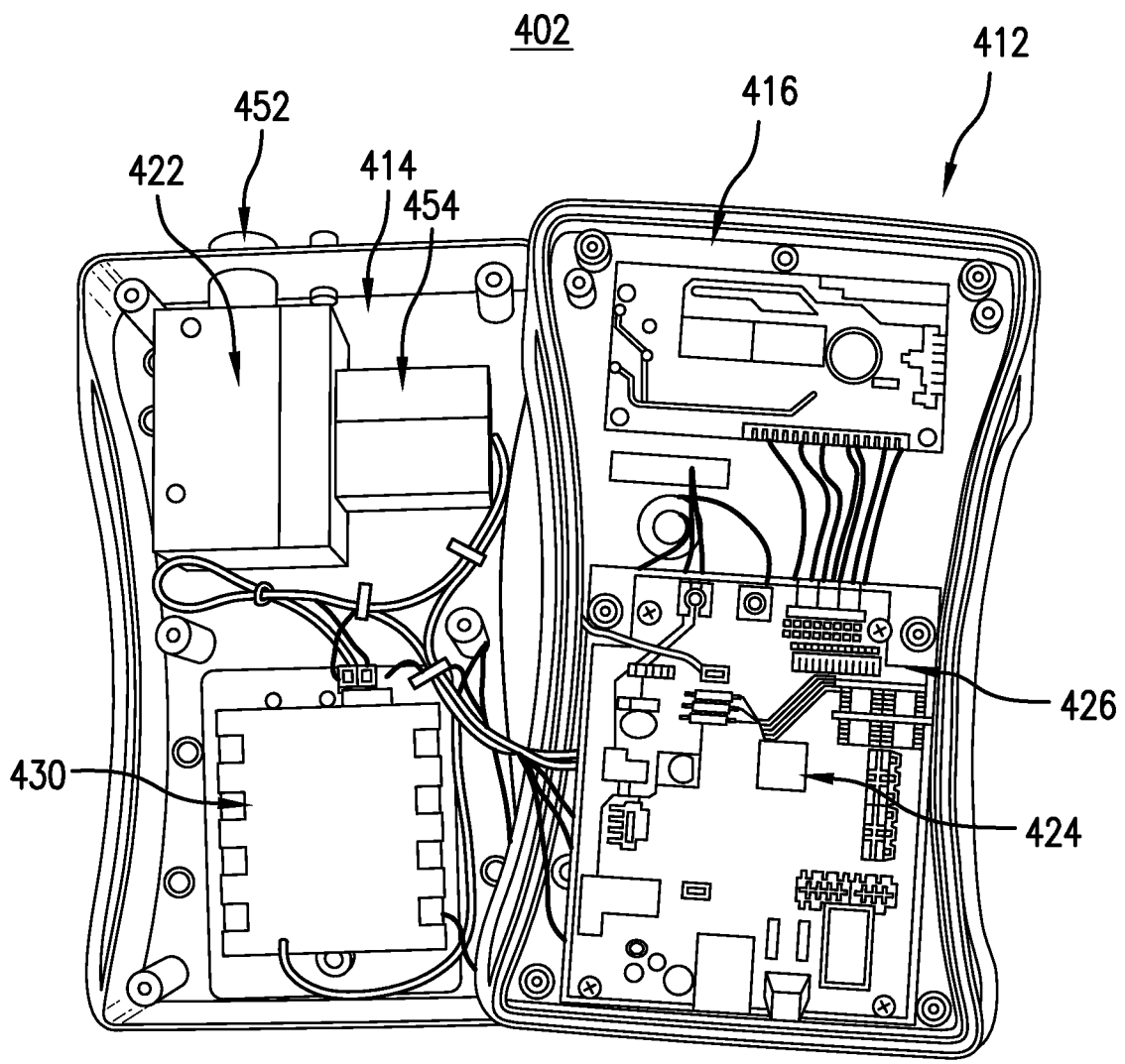
FIG. 5 shows the OSL reader of FIG. 4 with the casing of the OSL reader opened to show internal components.

FIGS. 4 and 5 depict handheld battery-operated POSL reader 402 according to one embodiment of the present invention. POSL reader 402 includes a hollow case 412 having two parts, i.e., part 414 and part 416. in which the various components of POSL reader 402 are mounted including an optical engine 422, a microprocessor 424 on a printed circuit board 426, a visual display 428 and a battery 430. A pushbutton 472 is used to activate POSL reader 402 for reading OSL sensors.

Optical engine 422 includes a lens assembly 452 and a photodetector 454. Illuminating light is emitted through lens assembly 452 when POSL reader is used to read an OSL sensor (not shown). Luminescent light emitted by the OSL sensor passes back through lens assembly 452 on its ways to being detected by photodetector 454.

Figure 6:
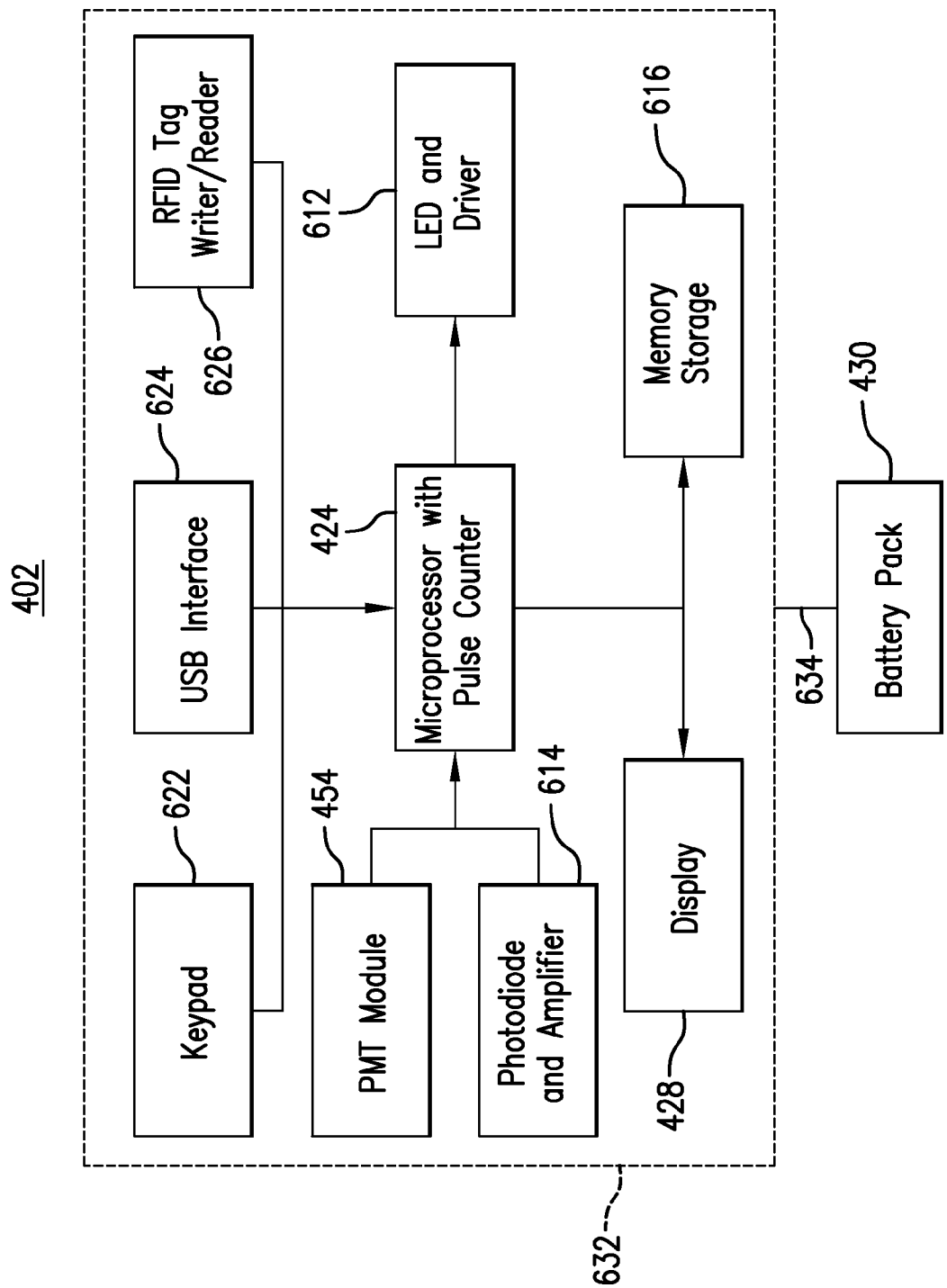
FIG. 6 is a block diagram of the OSL reader of FIG. 4 showing the various components of the OSL reader.

FIG. 6 is a block diagram showing various features of POSL reader 402 including microprocessor 424, visual display 428, battery 430 and photodetector 454. POSL reader 402 also includes an LED and driver 612, a photodiode 614, a storage medium 616, a keypad 622, a USB interface 624 and an RFID tag writer/reader 626. Electronic components of POSL reader 402, indicated by dashed box 632, are powered by battery 430 by various electrical connections represented by line 634.

In one embodiment of the present invention, the OSL reader and method of the present invention may be used to read an OSL sensor comprising an $Al_2O_3$:C material. In one embodiment of the present invention, the OSLM used in the OSL sensors may be a specialized carbon-doped aluminum oxide ($Al_2O_3$:C) material manufactured by Landauer, Inc. in Stillwater, Okla., and is similar to that marketed in dosimeters with trade names LUXEL+ and INLIGHT. This OSLM consists of specially formulated, proprietary, powderized $Al_2O_3$:C. In one embodiment of the present invention, the $Al_2O_3$:C material may be in the form a disc-shaped pellet or film. Exposure of such an $Al_2O_3$:C material to ionizing radiation causes electrons to be trapped in defects, i.e., electron traps, in the material's crystal structure. The electrons are released from these electron traps when stimulated with 520±25 nm wavelength light (i.e. green). As they return to the ground state, 420±25 nm wavelength light (i.e. blue) is emitted. It should be noted that other types of illumination light may be employed and other types of emitted luminescent light detected for an OSL reader of the present invention used to read OSL sensors containing different types of OSL materials. For reading such an OSL sensor, the LED light source may provide green illumination light having a wavelength centered at about 520 nm.

The present invention will not be described by way of the following examples which describe various embodiments and features of the present invention.

EXAMPLES

Example 1

Figure 7:
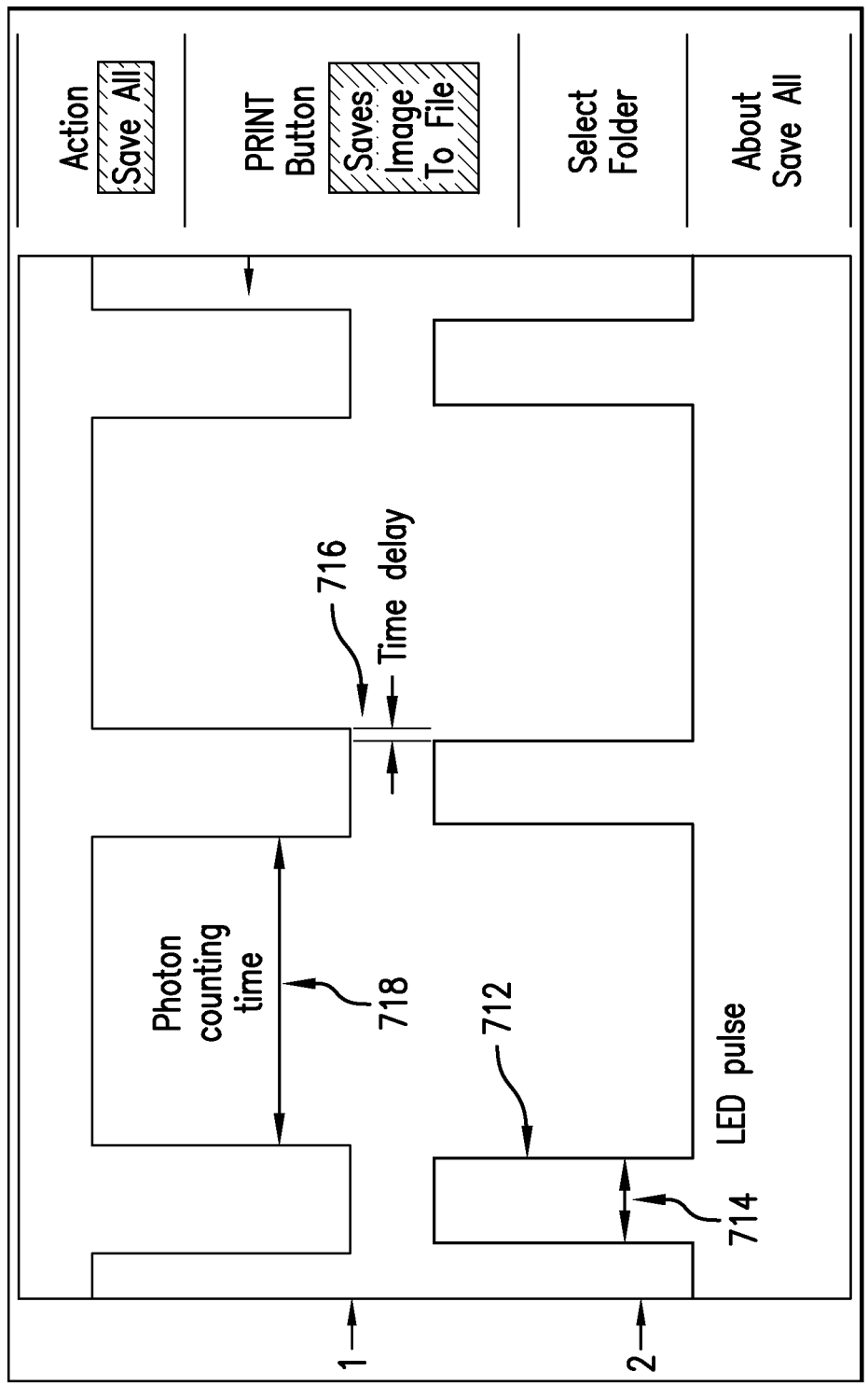
FIG. 7 is a time diagram of OSL reader operating in POSL mode under microprocessor control, showing LED pulse, time delay and photon counting time duration during several measurement cycles.

An example of the OSL reader operation for fast determination of a radiation dose accumulated by an OSL sensor using the method of the present invention is described below using FIG. 7 to depict the time sequence generated by microprocessor and recorded by the external oscilloscope during testing and calibration of the reader. FIG. 7 illustrates example of series of LED pulses 712 each having an LED pulse duration 714 (first parameter), a time delay 716 (second parameter) between the end of an LED pulse 712 and the start of a photon counting time 718 (third parameter). Because of the time scale FIG. 7 only shows two full cycles of the OSL reader operation, i.e., only two LED pulses 712 and two photon counting times 718. The start of the third cycle is indicated by the third LED pulse. The number of these cycles (fourth parameter) may be as large as 1000 or more.

Example 2

Figure 8:
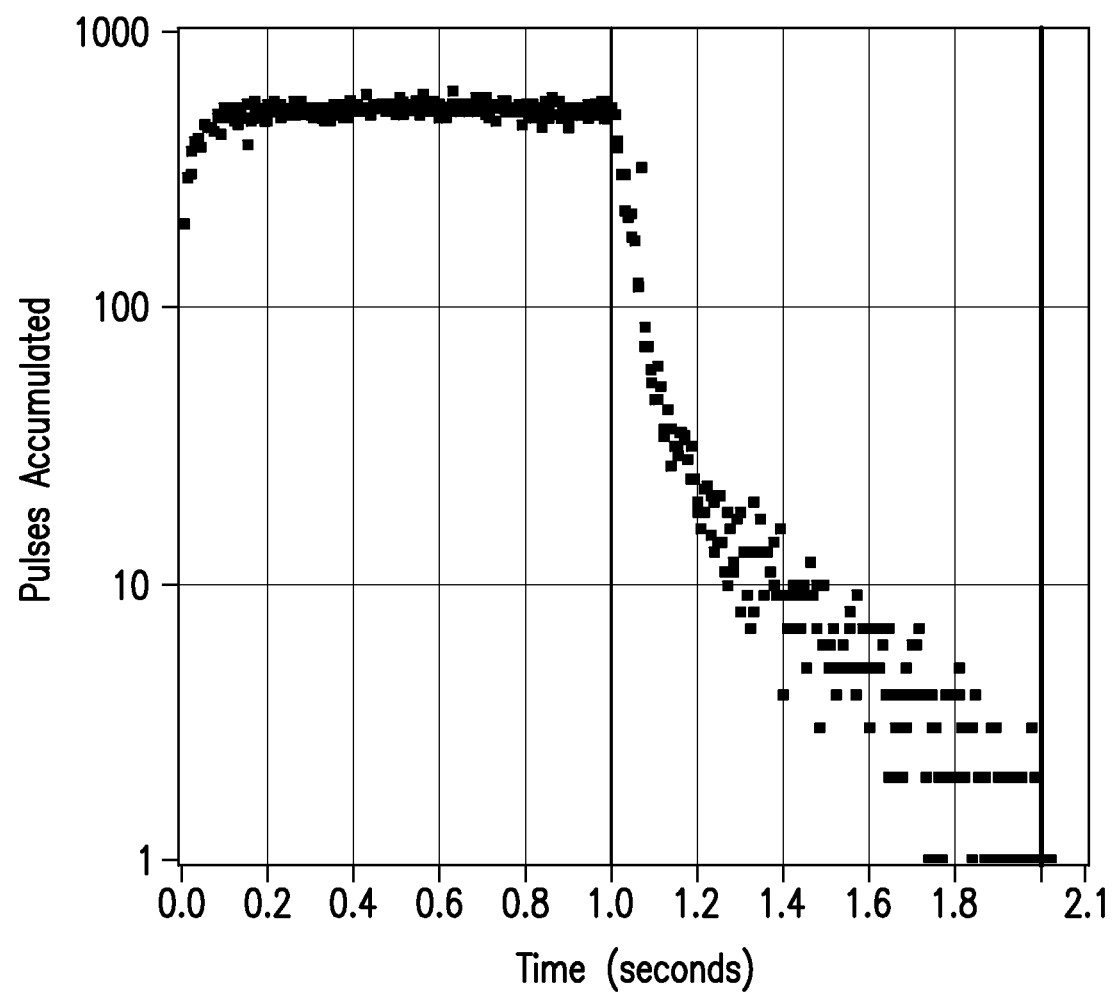
FIG. 8 is a graph illustrating time dependence of accumulated photon counting data for each measurement cycle acquired during a typical OSL measurement.

An example of OSL reader measurements according to one embodiment of the present invention present invention is described below using FIG. 8. FIG. 8 illustrates one POSL measurement performed by a microprocessor controlled OSL reader according to one embodiment of the present invention. In this example the reader performs 400 cycles with 5000 µs of time duration each for total of 2 seconds of time duration. Each cycle consisting of an LED pulse, Time delay and Photon counting time is represented on the graph by one dot. The LED pulses were generated only during first 200 cycles (1 s of measurements on the graph). The second part of the measurement from 1 to 2 seconds was performed without the LED pulses to illustrate the luminescent decay time of an $Al_2O_3$:C OSLM. The vertical axis represents number of single photon pulses accumulated by the microprocessor pulse counter during one cycle and is in logarithmic scale.

Example 3

An example showing the depletion of an OSL signal when an OSL reader is used to measure radiation dose in low dose mode is shown in FIG. 9. FIG. 9 is a graph illustrating the depletion of the OSL signal in Low Dose mode of measurements and is plotted as a function of readout number.

Example 4

An example showing the depletion of an OSL signal when an OSL reader is used to measure radiation dose in low dose mode is shown in FIG. 10. FIG. 10 is a graph illustrating the depletion of the OSL signal in High Dose mode of measurements and is plotted as a function of readout number.

All documents, patents, journal articles and other materials cited in the present application are incorporated herein by reference.

While the present invention has been disclosed with references to certain embodiments, numerous modification, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A method for determining a radiation dose comprising the following steps:
   (a) illuminating an optically stimulated luminescence (OSL) sensor with illumination light from an LED for a first period of time based on a first number of clock cycles of a microprocessor,
   (b) counting photon pulses generated by a photodetector using the pulse counter for a second period of time after a delay time,
   (c) repeating steps (a) and (b) for a first predetermined number of measurement cycles,
   (d) the microprocessor determining a radiation dose for one type of ionizing radiation to which the OSL sensor has been exposed based on a number of photon pulses counted in step (b) after steps (a) and (b) have been repeated for the first predetermined number of measurement cycles, and
   (e) displaying the radiation dose to a user and/or saving the radiation dose to a storage medium,
   wherein photons of luminescent light emitted by the OSL sensor are registered by the photodetector,
   wherein the photon pulses generated by the photodetector are based on the photons of luminescent light registered by the photodetector,
   wherein the second period of time is based on a second number of microprocessor clock cycles after a delay time based on a third number of microprocessor clock cycles,
   wherein the delay time is based on a third number of microprocessor clock cycles,
   wherein OSL sensor has been subjected to a dose of the one type of ionizing radiation prior to step (a),
   wherein the luminescent light is emitted by the OSL sensor in response to step (a), and
   wherein the pulse counter is part of the microprocessor.

2. The method of claim 1, wherein the OSL sensor contains an OSL material comprising $Al_2CO_3$:C.

3. The method of claim 1, wherein the first period of time has a first time value and the second period of time has a second time value, and wherein the first time value and the second time value together prevent photon pulses generated by the photodetector from overlapping in time and prevent the photodetector from being saturated by the luminescence light registered by the photodetector.

4. The method of claim 1, wherein the first period of time has a first time value and the second period of time has a second time value, and wherein the first time value and the second time value together reduce an amount of depletion of the OSL sensor per one readout below 1%.

5. The method of claim 1, wherein the first period of time is in the range of 1 μs to 1000 μs.

6. The method of claim 1, wherein the delay time is in the range of 10 μs to 50 μs.

7. The method of claim 1, wherein the second period of time is in the range of 100 μs to 10,000 μs.

8. The method of claim 1, wherein the first predetermined number of measurement cycles is in the range of 100 to 3000.

9. The method of claim 1, wherein step (e) comprises displaying the radiation dose to the user.

10. The method of claim 1, wherein step (e) comprises saving the radiation dose to the storage medium.

11. The method of claim 1, wherein the method comprises the following steps:
   (f) conducting test measurements comprising steps (a), (b) and (c) in a high dose mode for a second predetermined number of measurement cycles,
   (g) determining the number of photon pulses counted by the pulse counter during step (f),
   (h) determining if the number of photon pulses counted by the pulse counter in step (g) is less than a threshold parameter, and
   (i) conducting steps (a), (b) and (c) in low dose mode if it is determined in step (h) that the number of counted photon pulses is less than the threshold parameter or conducting steps (a), (b) and (c) in high dose mode for a normal number of measurement cycles if it is determined in step (h) that the number of photon pulses is equal to or greater than the threshold parameter,
   wherein the second predetermined number of measurement cycles is less than the normal number of measurement cycles.

* * * * *